No. 657,986. Patented Sept. 18, 1900.
E. KLUGE.
ASH SIFTER.
(Application filed Jan. 26, 1900.)

(No Model.) 2 Sheets—Sheet 1.

Witnesses:
E. F. Wilson
E. J. Boileau

Inventor:
Ernst Kluge
By Rudolph ... Attorney.

No. 657,986. Patented Sept. 18, 1900.
E. KLUGE.
ASH SIFTER.
(Application filed Jan. 26, 1900.)
(No Model.) 2 Sheets—Sheet 2.

UNITED STATES PATENT OFFICE.

ERNST KLUGE, OF CHICAGO, ILLINOIS.

ASH-SIFTER.

SPECIFICATION forming part of Letters Patent No. 657,986, dated September 18, 1900.

Application filed January 26, 1900. Serial No. 2,843. (No model.)

*To all whom it may concern:*

Be it known that I, ERNST KLUGE, a citizen of the United States, residing at Chicago, in the county of Cook and State of Illinois, have invented certain new and useful Improvements in Ash-Sifters; and I do hereby declare the following to be a full, clear, and exact description of the invention, such as will enable others skilled in the art to which it appertains to make and use the same.

My invention relates to a novel construction in an ash-sifter, the object being to provide a device of simple and efficient construction which can be used to sift ashes indoors; and it consists in the features of construction and combinations of parts hereinafter fully described and claimed.

Figure 1:
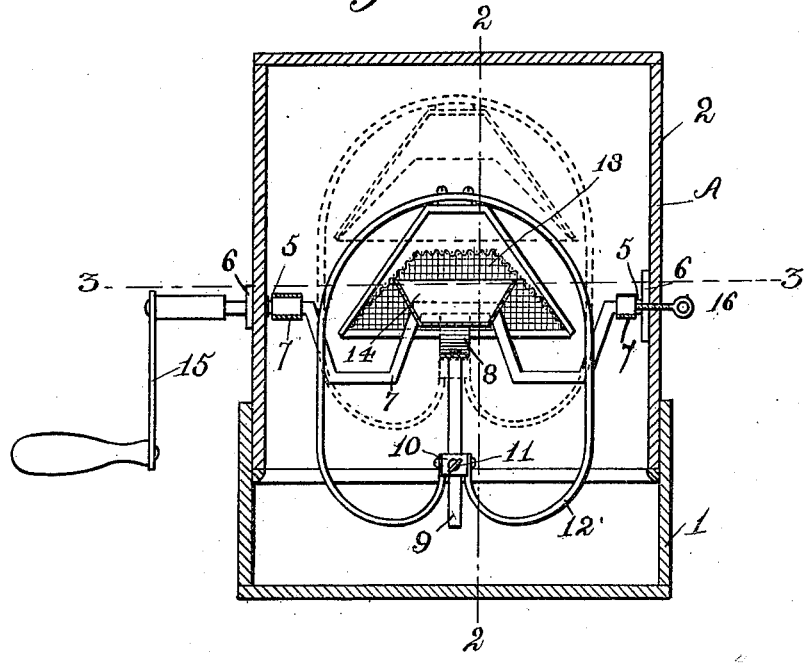
Figure 2:
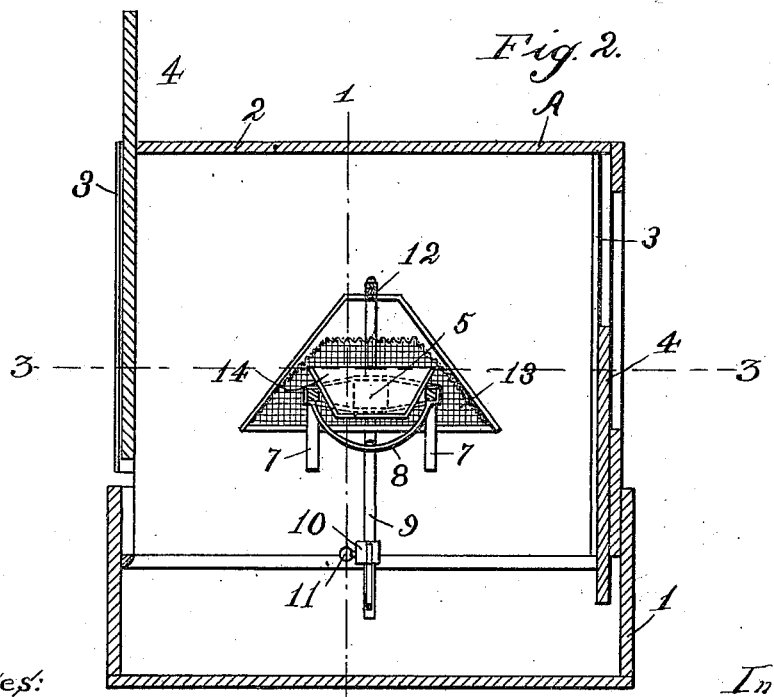
Figure 3:
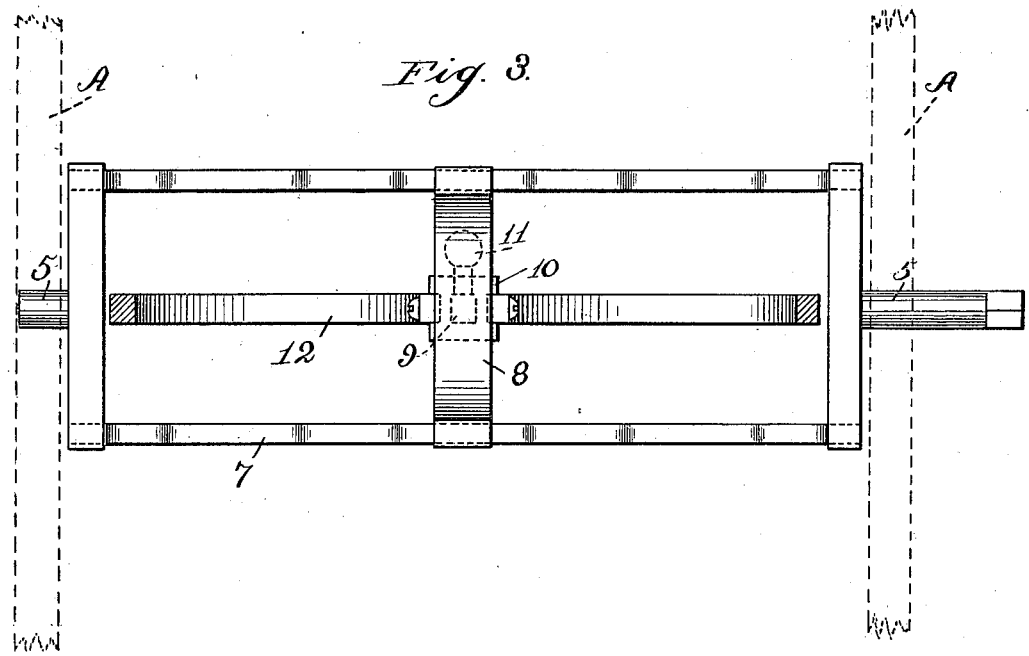

In the accompanying drawings, illustrating my invention, Figure 1 is a vertical transverse section of a sieve constructed in accordance with my invention, taken on the line 1 1 of Fig. 2. Fig. 2 is a vertical longitudinal section on the line 2 2 of Fig. 1. Fig. 3 is a fragmentary section, on an enlarged scale, on the lines 3 3 of Figs. 1 and 2, the ash-pan and sieve being removed and the side walls of the casing shown in dotted lines.

Referring now to said drawings, A indicates a casing comprising a lower or dust-receiving chamber or box 1 and an upper casing 2, adapted to be removably mounted on said box 1 and communicating therewith. The end portions of said casing carry guides 3, in which sliding doors 4 move. Extending transversely through said casing 2, in the middle thereof, and carrying studs 5 at its ends, journaled in bearings 6 in the side walls of said casing, is a frame 7, comprising parallel side pieces connected at their ends by cross-pieces carrying said studs 5. The said side pieces are of a shape somewhat similar to the letter W, the middle portions being about on a line with the cross-pieces and the portions between the middle and ends depressed. Said middle portions are joined by a practically semicircular cross-piece 8. Depending from said cross-piece 8 is a square bar 9, on which a collar 10, provided with a set-screw 11, is longitudinally adjustable. Carried by said collar 10 is a frame 12, comprising two curved side pieces which pass upwardly through said frame 7 on each side of said cross-piece 8 and meet at their upper ends. Depending from the upper end of said frame 12 and within the same is an inverted dished sieve 13 of foraminated metal. By means of said manner of mounting said sieve the latter can obviously be adjusted toward or away from said frame 7 in a radial direction, as shown in dotted lines in Fig. 1. An ash-pan 14 is adapted to be mounted upon said frame 7 at its middle portion above said cross-piece, the sieve being moved away to permit its insertion and can then be moved inwardly to rest snugly upon the edges of said pan and secured in such position. One of said studs 5 is adapted to receive a crank-shaft 15, by means of which said interior devices are revolved, the contents of the pan being thus thoroughly agitated and the fine ashes separated from the larger pieces of unburned coal. Such fine ashes fall into the box 1, and after same have been permitted to settle said casing 2 is removed and the contents of the box disposed of as desired. Said ash-pan is likewise removed and the contents thereof returned to the fuel-receptacle. In order to hold said revolving mechanism rigid while inserting and removing said ash-pan, I have provided a set-screw 16, passing through one of the side walls of said casing 1 and engaging one of the end cross-pieces of said frame 7.

I claim as my invention—

1. An ash-sifter comprising a casing consisting of an upper portion containing sifting devices and a lower removable receptacle for fine ashes, said sifting mechanism comprising a revoluble frame adapted to carry an ash-pan, a perpendicular bar carried thereby, a collar longitudinally adjustable on said bar, a frame carried thereby, and an inverted dished sieve carried by said frame and adapted to be moved to cover and uncover said pan on said frame.

2. In an ash-sifter, the combination with a casing, of a revoluble frame mounted therein and adapted to carry a removable ash-pan at its middle portion, a bar rigidly mounted on said frame and extending perpendicularly thereto, a collar adjustably mounted on said bar and carrying a frame extending through said first-named frame, an inverted dished sieve carried by said last-named frame and adapted to be moved therewith to cover and uncover said removable pan, and devices for holding said first-named frame rigid to permit insertion and removal of said pan.

In testimony whereof I affix my signature in presence of two witnesses.

ERNST KLUGE.

Witnesses:
RUDOLPH WM. LOTZ,
E. F. WILSON.